United States Patent
Li et al.

(10) Patent No.: US 12,210,709 B2
(45) Date of Patent: Jan. 28, 2025

(54) DISPLAY SUBSTATE INCLUDING TOUCH SIGNAL LINES ARRANGED BETWEEN PIXEL GROUPS, AND DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Zhe Li, Beijing (CN); Peng Li, Beijing (CN)

(73) Assignees: Chongqing BOE Optoelectronics Technology Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/022,142

(22) PCT Filed: Mar. 10, 2022

(86) PCT No.: PCT/CN2022/080071
§ 371 (c)(1),
(2) Date: Feb. 18, 2023

(87) PCT Pub. No.: WO2023/273401
PCT Pub. Date: Jan. 5, 2023

(65) Prior Publication Data
US 2023/0333696 A1    Oct. 19, 2023

(30) Foreign Application Priority Data
Jun. 30, 2021    (CN) .......................... 202110732550.2

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 3/04166* (2019.05);
(Continued)

(58) Field of Classification Search
None
See application file for complete search history.

(56) References Cited

U.S. PATENT DOCUMENTS

2014/0300714 A1\* 10/2014 Muller .................. H04N 13/31
                                                            348/54
2016/0117039 A1\*  4/2016 Zhao ................... G02F 1/13338
                                                            345/173
(Continued)

FOREIGN PATENT DOCUMENTS

CN    104298404 A    1/2015
CN    105159520 A   12/2015
(Continued)

*Primary Examiner* — Kirk W Hermann
(74) *Attorney, Agent, or Firm* — HOUTTEMAN LAW LLC (57) ABSTRACT

A display substrate, including: a base substrate, a plurality of sub-pixels each including at least a pixel electrode and a common electrode; a first interlayer insulating layer between layers where the pixel electrode and the common electrode are respectively located; and a plurality of touch signal lines extending along a second direction and arranges side by side along a first direction, where a distance between orthographic projections of the touch signal line and the pixel electrode in the sub-pixel closest to the touch signal line in the first direction on the base substrate is a first distance; a distance between orthographic projections of the touch signal line and the common electrode in the sub-pixel closest to the touch signal line in the first direction on the base substrate is a second distance, and the first distance is less than the second distance.

18 Claims, 9 Drawing Sheets

(52) U.S. Cl.
CPC .. *G06F 3/0443* (2019.05); *G06F 2203/04103* (2013.01); *G06F 2203/04107* (2013.01)

(56) References Cited

U.S. PATENT DOCUMENTS

| | | | | |
|---|---|---|---|---|
| 2016/0259460 | A1* | 9/2016 | Yang | G06F 3/0445 |
| 2017/0115784 | A1* | 4/2017 | Li | G02F 1/13338 |
| 2017/0123544 | A1* | 5/2017 | Ham | G02F 1/134309 |
| 2018/0239475 | A1* | 8/2018 | Guo | G02F 1/13338 |
| 2020/0356205 | A1* | 11/2020 | Sun | G06F 3/04164 |

FOREIGN PATENT DOCUMENTS

| | | | | |
|---|---|---|---|---|
| CN | 206039485 U | * | 3/2017 | |
| CN | 106802507 A | * | 6/2017 | ......... G02F 1/13338 |
| CN | 106886110 A | | 6/2017 | |
| CN | 109856874 A | | 6/2019 | |
| CN | 210442782 U | | 5/2020 | |
| TW | 700535 B | | 8/2020 | |

* cited by examiner

DISPLAY SUBSTATE INCLUDING TOUCH SIGNAL LINES ARRANGED BETWEEN PIXEL GROUPS, AND DISPLAY APPARATUS

TECHNICAL FIELD

The present disclosure belongs to the technical field of display, and particularly relates to a display substrate and a display apparatus.

BACKGROUND

With the development of touch screen technology, various touch technologies have emerged. According to the operating principle of the touch screen, the touch technologies generally include a resistive touch screen, a capacitive touch screen, an infrared touch screen, an electromagnetic touch screen, and a surface acoustic wave touch screen. Among them, the capacitive touch screen is most widely used.

SUMMARY

The present disclosure aims to solve at least one technical problem in the prior art and provides a display substrate and a display apparatus.

In a first aspect, an embodiment of the present disclosure provides a display substrate, including:
  a base substrate,
  a plurality of sub-pixels on the base substrate, where each of the plurality of sub-pixels includes at least a pixel electrode and a common electrode on the base substrate; the sub-pixels arranged side by side in a first direction form a first pixel group; and the sub-pixels arranged side by side in a second direction form a second pixel group;
  a first interlayer insulating layer between a layer where the pixel electrode is located and a layer where the common electrode is located; and
  a plurality of touch signal lines on the base substrate, where the plurality of touch signal lines extend along the second direction and are arranged side by side along the first direction,
  where each of the plurality of touch signal lines is arranged between corresponding two adjacent second pixel groups in at least a part of the second pixel groups; and
  for any one of the plurality of touch signal lines, a distance between orthographic projections of the touch signal line and the pixel electrode in the sub-pixel closest to the touch signal line in the first direction on the base substrate is a first distance; a distance between orthographic projections of the touch signal line and the common electrode in the sub-pixel closest to the touch signal line in the first direction on the base substrate is a second distance, and the first distance is less than the second distance.

The pixel electrode is closer to the base substrate than the common electrode; and the touch signal line and the pixel electrode are in a same layer.

The common electrode is closer to the base substrate than the common electrode; and the touch signal line and the common electrode are in a same layer.

The display substrate further includes:
  a plurality of data lines on the base substrate, where the plurality of data lines extend along the second direction and are arranged side by side along the first direction; and data voltage signals are supplied to the sub-pixels in a same second pixel group through a same data line.

The data line and the touch signal line are in a same layer.
The display substrate further includes:
  a plurality of shielding electrodes on a side of the first interlayer insulating layer away from the base substrate, where an orthographic projection of each of the plurality of shielding electrodes on the base substrate covers an orthographic projection of one corresponding data line on the base substrate.

Orthographic projections, on the base substrate, of center lines of the shield electrode and the data line, which have orthographic projections on the base substrate overlapping each other, coincide with each other.

The shielding electrode and the common electrode are in a same layer and are made of a same material.

The plurality of data line are on a side of the plurality of touch signal lines close to the base substrate, and a second interlayer insulating layer is between a layer where the plurality of touch signal line are located and a layer where the plurality of data lines are located.

An orthographic projection of each of the plurality of data lines on the base substrate at least partially overlaps an orthographic projection of a corresponding one of the plurality of touch signal lines on the base substrate.

The display substrate further includes a plurality of gate lines on the base substrate; where the plurality of gate lines extend along the first direction and are arranged side by side along the second direction; and
  a scan signal is supplied to the sub-pixels in a same first pixel group through a same gate line; and data voltages are supplied to the sub-pixels in one of the second pixel groups through a corresponding one of the plurality of data lines.

The display substrate further includes a plurality of gate lines on the base substrate; where the plurality of gate lines extend along the first direction and are arranged side by side along the second direction; and
  two scan signals are supplied to the sub-pixels in a same first pixel group through two gate lines, respectively, where the sub-pixels in odd-numbered second pixel groups and in the first pixel group are controlled by one of the two gate lines, and the sub-pixels in even-numbered second pixel groups and in the first pixel group are controlled by the other of the two gate lines; and
  for every two adjacent second pixel groups, data voltage signals are supplied to the sub-pixels in the two adjacent second pixel groups through a corresponding one of the plurality of data lines.

Each of the plurality of data lines and a corresponding one of the plurality of touch signal lines are on different sides of a same second sub-pixel in the first direction.

A ratio of the first distance to the second distance is greater than or equal to 0.5, and less than 1.

The first distance is in a range of 1 μm to 10 μm; the second distance is in a range of 1 μm to 15 μm.

One of the pixel electrode and the common electrode is a plate electrode, the other of the pixel electrode and the common electrode is a slit electrode, and the plate electrode is closer to the base substrate than the slit electrode; and
  a width of the slit electrode is in a range of 1 μm to 5 μm, and a gap between any two adjacent slit electrodes is in a range of 1 μm to 10 μm; and a width of the plate electrode is not less than 3 μm.

A line width of the touch signal line is in a range of 1 μm to 10 μm.

In a second aspect, an embodiment of the present disclosure provides a display apparatus, including the display substrate described above.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

It should be noted that an embodiment of the present disclosure provides a display substrate and a display apparatus. The display apparatus may be a Liquid Crystal Display (LCD) apparatus or an Organic Light-Emitting Diode (OLED) display apparatus. Alternatively, other types of display apparatuses are also possible, which are not listed herein. In the embodiments of the present disclosure, a liquid crystal display apparatus is described as an example of the display apparatus. The liquid crystal display apparatus includes a display substrate and an opposite substrate which are opposite to each other, and a liquid crystal layer arranged between the display substrate and the opposite substrate. The display substrate may be an array substrate, or a COA (Color On Array) substrate. Where the display substrate is an array substrate, the opposite substrate includes a color filter layer; where the display substrate is a COA substrate, it is not necessary to provide the color filter layer in the opposite substrate. In the embodiments of the present disclosure, an array substrate is taken as an example of the display substrate.

Figure 1:
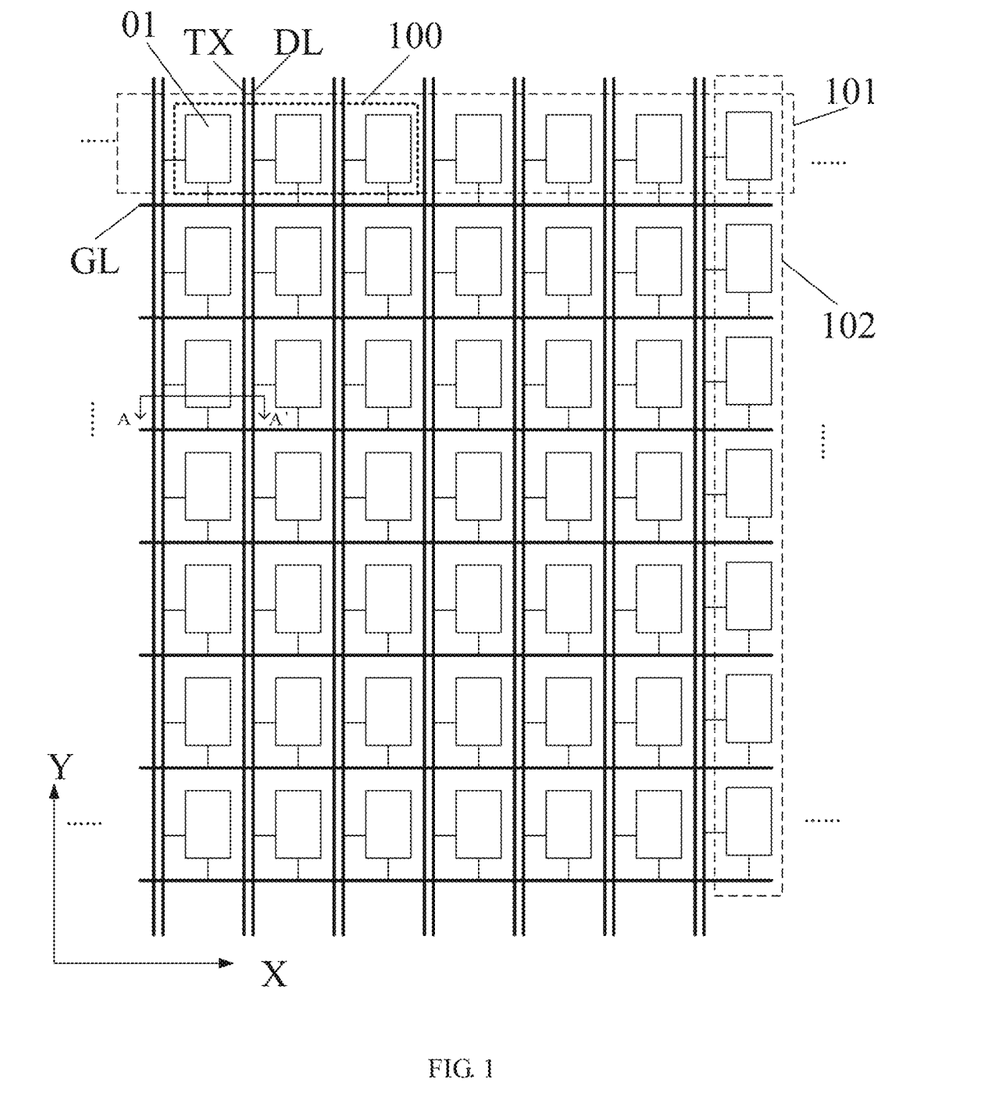
FIG. 1 is a schematic diagram of an exemplary display substrate.
Figure 2:
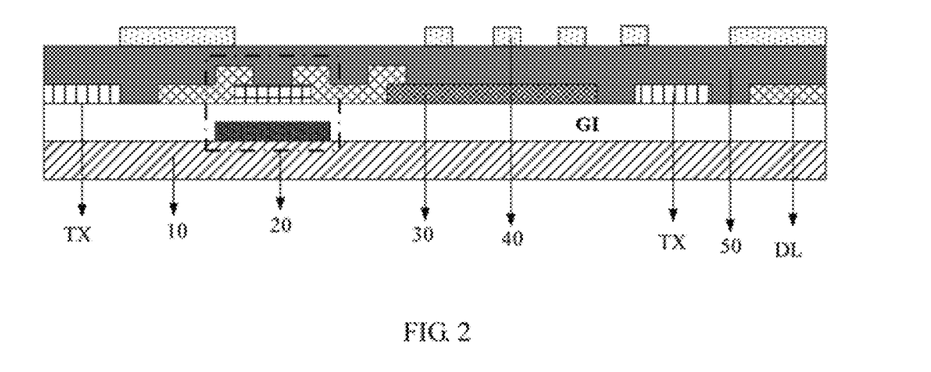
FIG. 2 is a cross-sectional view of the display substrate shown in FIG. 1 taken along a line A-A'.

FIG. 1 is a schematic diagram of an exemplary display substrate; and FIG. 2 is a cross-sectional view of the display substrate shown in FIG. 1 taken along a line A-A'. As shown in FIGS. 1 and 2, especially as shown in FIG. 1, the display substrate includes a base substrate 10, a plurality of gate lines GL and a plurality of data lines DL arranged on the base substrate 10, and a plurality of sub-pixels defined by the gate lines GL and the data lines DL crossing each other. The plurality of gate lines GL extend along a first direction X and are arranged side by side along a second direction Y. The plurality of data lines DL extend along the second direction Y and are arranged side by side along the first direction X. Multiple sub-pixels 01 arranged side by side along the first direction X form a first pixel group; and multiple sub-pixels 01 arranged side by side along the second direction Y form a second pixel group. Each sub-pixel includes at least a thin film transistor 20, a pixel electrode 30, and a common electrode 40. The gates of the thin film transistors 20 in the sub-pixels 01 in a same first pixel group are connected to a same gate line GL; and the sources of the thin film transistors 20 in the sub-pixels in a same second pixel group are connected to a same data line DL. Referring to FIG. 2, the thin film transistor 20 in the sub-pixel 01 includes a gate, an active layer, and a source and a drain, which are sequentially arranged in a direction away from the base substrate 10. The drain of the thin film transistor 20 is connected to the pixel electrode 30. A gate insulating layer GI is arranged between the gate and the active layer, and the pixel electrode 30 is located on a side of the gate insulating layer GI away from the base substrate 10. A first interlayer insulating layer 50 covers the source and the drain of the thin film transistor 20, and the pixel electrode 30 on a side of the source, the drain, and the pixel electrode 30 away from the base substrate 10, and the common electrode 40 is formed on a side of the first interlayer insulating layer 50 away from the base substrate 10. In FIG. 2, the pixel electrode 30 is a plate electrode, and the common electrode 40 is a slit electrode.

In addition, with reference to FIG. 1, the display substrate includes a plurality of pixel units 100 arranged in an array, where each pixel unit 100 includes N number of sub-pixels, N≥2, and N is an integer. In an embodiment of the present disclosure, one pixel unit includes three sub-pixels, that is, N=3 is taken as an example. For example, each pixel unit includes a red sub-pixel, a green sub-pixel, and a blue sub-pixel. In this case, the sub-pixels in the same column may emit light of the same color.

With continued reference to FIG. 2, the display substrate may implement a touch function in a display apparatus, and therefore, the display substrate includes not only the above structures, but also touch signal lines and touch electrodes, where each touch electrode is connected to one corresponding touch signal line. One touch electrode may be arranged in multiple pixel units arranged in an array, or be arranged in each pixel unit. The common electrode 40 in the sub-pixel may also serve as a touch electrode in an embodiment of the present disclosure. For example, the common electrodes 40 in the multiple sub-pixels arranged in an array are connected together to form a one-piece structure and serve as a touch electrode, and the touch signal line TX is located between the second pixel groups adjacent to each other. In this case, in a display stage, a common voltage signal is input to the touch signal line TX, and the touch electrode serves as a common electrode. In a touch stage, a touch signal is input to the touch signal line TX, and a touch position is determined by reading a signal output by the touch signal line TX. In the description of the embodiments of the present disclosure, it is taken as an example for description that the common electrode also serves as the touch electrode.

It should be noted that, in the embodiments of the present disclosure, the first direction X and the second direction Y do not refer to a direction extending straight, but refer to a trend of a certain structure or a longitudinal direction of a certain structure. In FIG. 2, it is only an example that the thin film transistor 20 is a bottom gate thin film transistor 20, which does not limit the protection scope of the embodiments of the present disclosure. The thin film transistor 20 may alternatively be a top gate thin film transistor 20.

The inventor finds that, in the related art, usually, a distance between the touch signal line TX and the common electrode 40 is less than a distance between the touch signal line TX and the pixel electrode 30. Further, the touch signal line TX inputs a common voltage signal to the common electrode 40 in the display phase, that is, the potentials of the common electrode 40 and the touch signal line TX are equal in the display phase, so that there is no electric field between the touch signal line and the common electrode 40, and thus liquid crystal molecules of a display apparatus including the display substrate will not deflect at the position, and therefore, light effect at the edge is reduced, and the overall transmittance of the display apparatus is reduced.

In view of the above technical problems, the following technical solutions are provided in the embodiments of the present disclosure.

Figure 3:
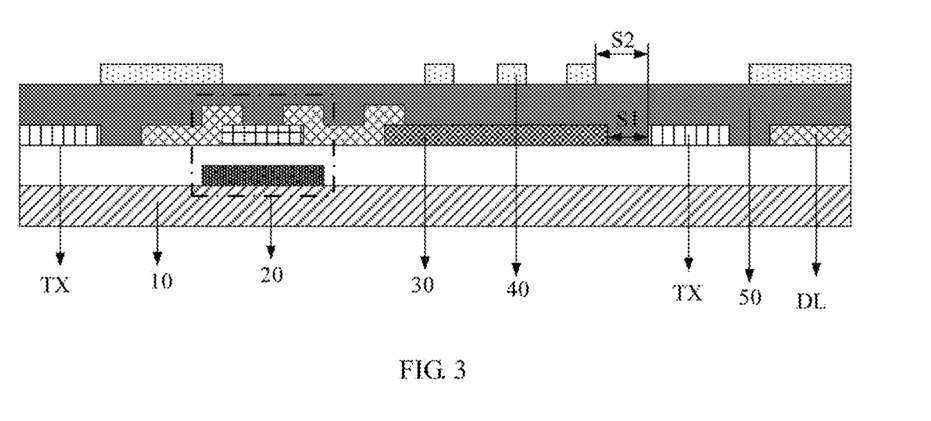
FIG. 3 is a cross-sectional view of a part of a display substrate according to an embodiment of the present disclosure.

FIG. 3 is a cross-sectional view of a display substrate according to an embodiment of the present disclosure. In a first aspect, as shown in FIG. 3, an embodiment of the present disclosure provides a display substrate, which includes a base substrate 10, a plurality of sub-pixels 01, a first interlayer insulating layer 50 and a plurality of touch signal lines TX. Each of the plurality of sub-pixel 01 is arranged on the base substrate 10, and at least includes a pixel electrode 30 and a common electrode 40 arranged on the base substrate 10. The sub-pixels 01 arranged side by side in the first direction X form a first pixel group 101. The sub-pixels 01 arranged side by side in the second direction Y form a second pixel group 102. A first interlayer insulating layer 50 is arranged between a layer where the pixel electrode 30 is located and a layer where the common electrode 40 is located. The plurality of touch signal lines TX are arranged on the base substrate 10, extend along the second direction Y and are arranged side by side along the first direction X. The touch signal line TX is arranged between any two adjacent ones of at least a part of the second pixel groups 102. In the embodiment of the present disclosure, for any touch signal line TX, a distance between orthographic projections of the touch signal line TX and the pixel electrode 30 in the sub-pixel 01 closest to the touch signal line TX in the first direction X on the base substrate 10 is a first distance S1; a distance between of the orthographic projection of the touch signal line TX on the base substrate 10 and an orthographic projection of the common electrode 40 in the sub-pixel 01 closest to the touch signal line TX in the first direction X on the base substrate 10 is a second distance S2, and the first distance S1 is less than the second distance S2.

It should be noted that, in the embodiment of the present disclosure, the sub-pixel 01 includes not only the pixel electrode 30 and the common electrode 40, but also a thin film transistor 20, and the specific structure of the thin film transistor 20 may be identical to that shown in FIG. 2. The thin film transistor 20 is only denoted by the reference number 20 in FIG. 3, and the description thereof is not repeated herein.

In the embodiment of the present disclosure, in the display substrate, the distance between the orthographic projections of any one of the touch signal lines TX and the pixel electrode 30 closest to the touch signal line TX on the base substrate 10 is the first distance S1, the distance between the orthographic projections of the touch signal line TX and the common electrode 40 closest to the touch signal line TX on the base substrate 10 is the second distance S2, and the first distance S1 is less than the second distance S2, and at the same time, a common voltage is written into the touch signal line TX in the display stage, so that the touch signal line TX and the pixel electrode 30, the orthographic projection of which on the base substrate 10 is closest to the orthographic projection of the touch signal line TX on the base substrate 10, may form a common electric field in the display stage, and the liquid crystal molecules between the touch signal line TX and the pixel electrode 30 of the display apparatus including the display substrate may be deflected, thereby improving the overall transmittance of the display apparatus.

In the embodiment of the present disclosure, one of the pixel electrode 30 and the common electrode 40 is a plate electrode, and the other of the pixel electrode 30 and the common electrode 40 is a slit electrode, and the plate electrode is closer to the base substrate 10 than the slit electrode. In some examples, a width of the slit electrode is in a range of about 1 μm to 5 μm, and a gap between any two adjacent slit electrodes is in a range of about 1 μm to 10 μm; and a width of the plate electrode is not less than 3 μm. A line width of the touch signal line is in a range of about 1 μm to 10 μm.

In some examples, in order to enable the touch signal line TX and the pixel electrode 30 closest thereto to form a stable planar electric field in the display stage, and prevent the common electrode 40 closest to the touch signal line TX from interfering with the electric field, it is necessary to reasonably set the distance between the touch signal line TX and the pixel electrode 30 and the distance between the touch signal line TX and the common electrode 40, that is, it is necessary to reasonably set the first distance S1 and the second distance S2. In the embodiment of the present disclosure, a ratio of the first distance S1 to the second distance S2 is greater than or equal to 0.5, and less than 1. For example, the ratio of the first distance S1 to the second distance S2 may be 0.55. In some examples, the first distance S1 is in a range of about 1 μm to 10 μm; and the second distance S2 is in a range of about 1 μm to 15 μm.

In some examples, the display substrate may include not only the above structures but also a plurality of gate lines GL and a plurality of data lines DL.

In one example, as shown in FIG. 1, a plurality of gate lines GL and a plurality of data lines DL are arranged to cross each other, and each sub-pixel 01 is arranged at one corresponding cross position. That is, a scan signal is supplied to the sub-pixels 01 in the same first pixel group 101 through a same gate line GL, and data voltage signals are supplied to the sub-pixels 01 in the same second pixel group 102 through a same data line DL. For example, the gates of the thin film transistors 20 in the sub-pixels 01 in the same first pixel group 101 are connected to the same gate line GL, and the sources of the thin film transistors 20 in the sub-pixels 01 in the same second pixel group 102 are connected to the same data line DL.

Figure 4:
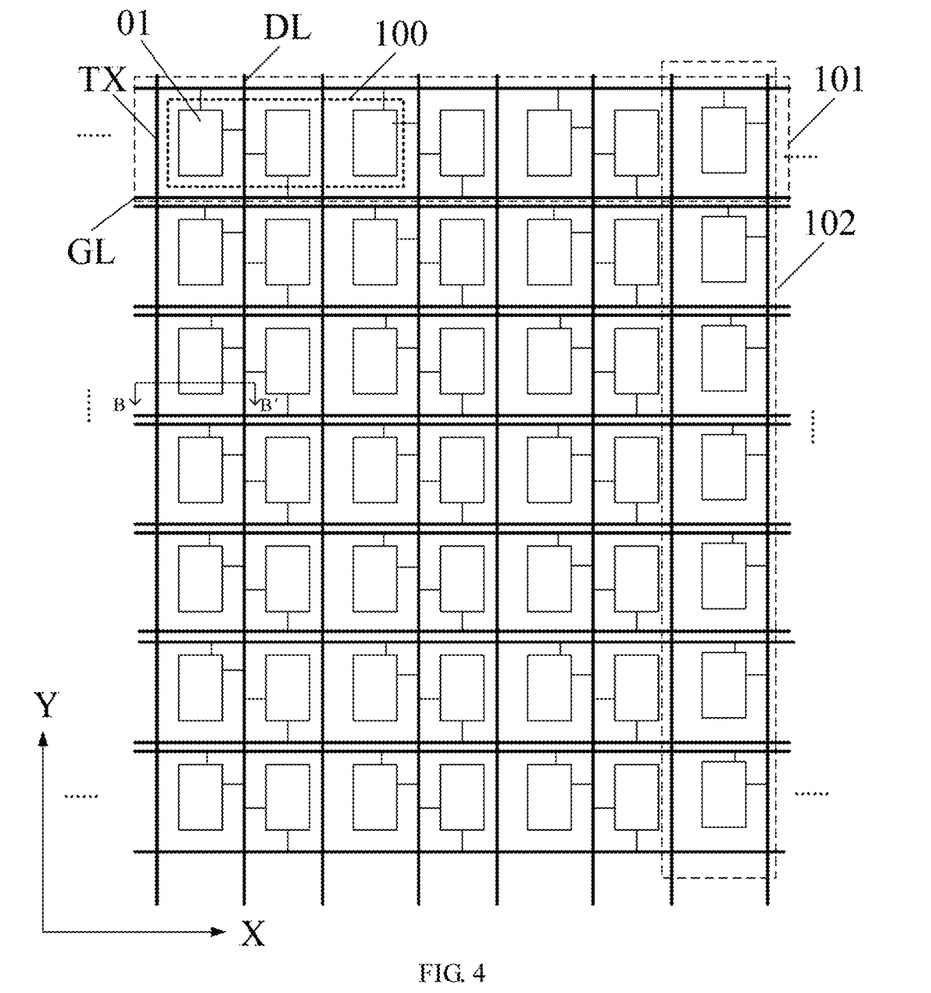
FIG. 4 is a schematic diagram of a display substrate according to an embodiment of the present disclosure.

FIG. 4 is a schematic diagram of a display substrate according to an embodiment of the present disclosure. In another example, as shown in FIG. 4, scan signals are provided to the sub-pixels 01 in the same first pixel group 101 by the same two gate lines GL, and scan signals are supplied to the sub-pixels 01 in odd-numbered second pixel groups 102 and the sub-pixels 01 in even-numbered second pixel groups 102 by different gate lines GL, respectively. For every two second pixel groups 102, data voltage signals are supplied by a same data line DL thereto. Specifically, the gates of the thin film transistors 20 in the sub-pixels 01 in a same first pixel group 101 and in the odd-numbered second pixel groups 102 are connected to a same gate line GL, and the gates of the thin film transistors 20 in the sub-pixels 01 in a same first pixel group 101 and in the even-numbered second pixel groups 102 are connected to a same gate line GL. The sources of the thin film transistors 20 in the sub-pixels 01 in every two adjacent second pixel groups 102 are connected to the same data line DL.

In some examples, two gate lines GL for supplying scan signals to the sub-pixels 01 in the same first pixel group 101 are located at two sides of the first pixel group 101 in the second direction Y, respectively. In some examples, a data line DL is located between two second pixel groups 102, to which the data voltage signals are supplied by this data line DL. With this arrangement, wiring is facilitated, and connection between the sub-pixels 01 and the signal lines is also facilitated.

In some examples, the touch signal line may be arranged in the same layer as the common electrode 40, or may be arranged in the same layer as the pixel electrode 30. The following describes positions of the pixel electrode 30, the common electrode 40, and the touch signal line TX in the display substrate according to the embodiment of the present disclosure with reference to specific examples, but it should be noted that the following examples do not limit the protection scope of the embodiments of the present disclosure.

A first example is as follows: the display substrate is the display substrate shown in FIGS. 1 and 5, and includes a plurality of gate lines GL, a plurality of data lines DL, a plurality of touch signal lines TX, and a plurality of sub-pixels 01. The gate lines GL extend along the first direction X and are arranged side by side along the second direction Y, and the data lines DL and the touch signal lines TX extend along the second direction Y and are arranged side by side along the first direction X. The gate line GL and the data line DL are arranged to cross each other, and a sub-pixel 01 is arranged at the cross position of the gate line GL and the data line DL. The gates of the thin film transistors 20 in the sub-pixels 01 in the same first pixel group 101 are connected to the same gate line GL, and the sources of the thin film transistors 20 in the sub-pixels 01 in the same second pixel group 102 are connected to the same data line DL. A first pixel group 101 is arranged between any two adjacent gate lines GL; a second pixel group 102 is arranged between any two adjacent data lines DL; and a second pixel group 102 is arranged between any two adjacent touch signal lines TX.

Figure 5:
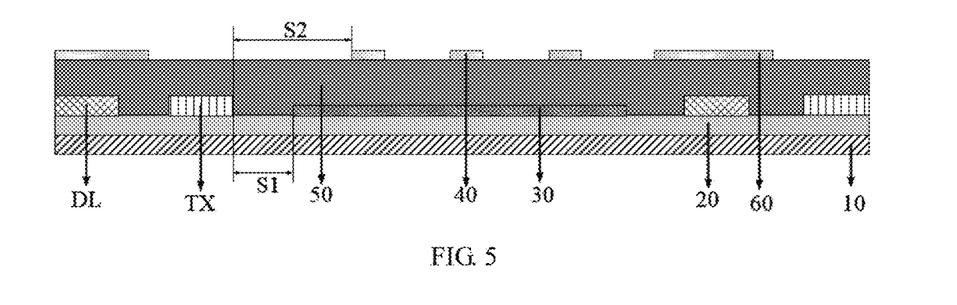
FIG. 5 is a cross-sectional view of a part of a display substrate according to an embodiment of the present disclosure.

Referring to FIG. 5, the pixel electrode 30 and the common electrode 40 in each sub-pixel 01 are a plate electrode and a slit electrode, respectively. In this case, the pixel electrode 30 is closer to the base substrate 10 than the common electrode 40. A first interlayer insulating layer 50 is arranged between the pixel electrode 30 and the common electrode 40, and the touch signal line TX and the data line DL are arranged in the same layer as the pixel electrode 30. A distance between orthographic projections of any touch signal line TX in the display substrate and the pixel electrode 30 closest to the touch signal line TX on the base substrate 10 is a first distance S1, a distance between orthographic projections of the touch signal line TX and the common electrode 40 closest to the touch signal line TX on the base substrate 10 is a second distance S2, and the first distance S1 is less than the second distance S2, so that in the display stage, not only the pixel electrode 30 and the common electrode 40 form a fringe electric field, but also the pixel electrode 30 and the touch signal line TX form a coplanar electric field, and when the display substrate is applied to a display apparatus, the light transmittance can be effectively improved.

In some examples, a plurality of shielding electrodes 60 are further arranged on a side of the first interlayer insulating layer 50 away from the base substrate 10, and an orthographic projection of each shielding electrode 60 on the base substrate 10 covers an orthographic projection of one corresponding data line DL on the base substrate 10. The reason for such an arrangement is to prevent the liquid crystal molecules of the display apparatus including the display substrate from ineffectively deflecting at the position to affect the display of the display apparatus due to an electric field generated between the touch signal line and the data line DL in the display stage. The shielding electrode 60 in the embodiment of the present disclosure may be arranged in the same layer and made of the same material as the common electrode 40, so that the common electrode 40 and the shielding electrode 60 may be formed through one patterning process, which does not increase the process steps and is also beneficial to thinning the product. Further, in the embodiment of the present disclosure, on the basis of overlapping each other, the orthographic projections of the shielding electrode 60 and the data line DL on the base substrate 10 have a common center line, so that the shielding electrode 60 can be ensured to well cover the electric field area formed between the data line DL and the common electrode 40.

In addition, it should be noted that, since one data line DL and one touch signal line TX are arranged between any two adjacent second pixel groups 102, in order to facilitate connection between the data line DL and the source of the thin film transistor 20 in the sub-pixel 01, the touch signal line TX is located on a side of the data line DL closest to the touch signal line TX away from the second pixel group 102 to which the data line DL is connected.

Figure 6:
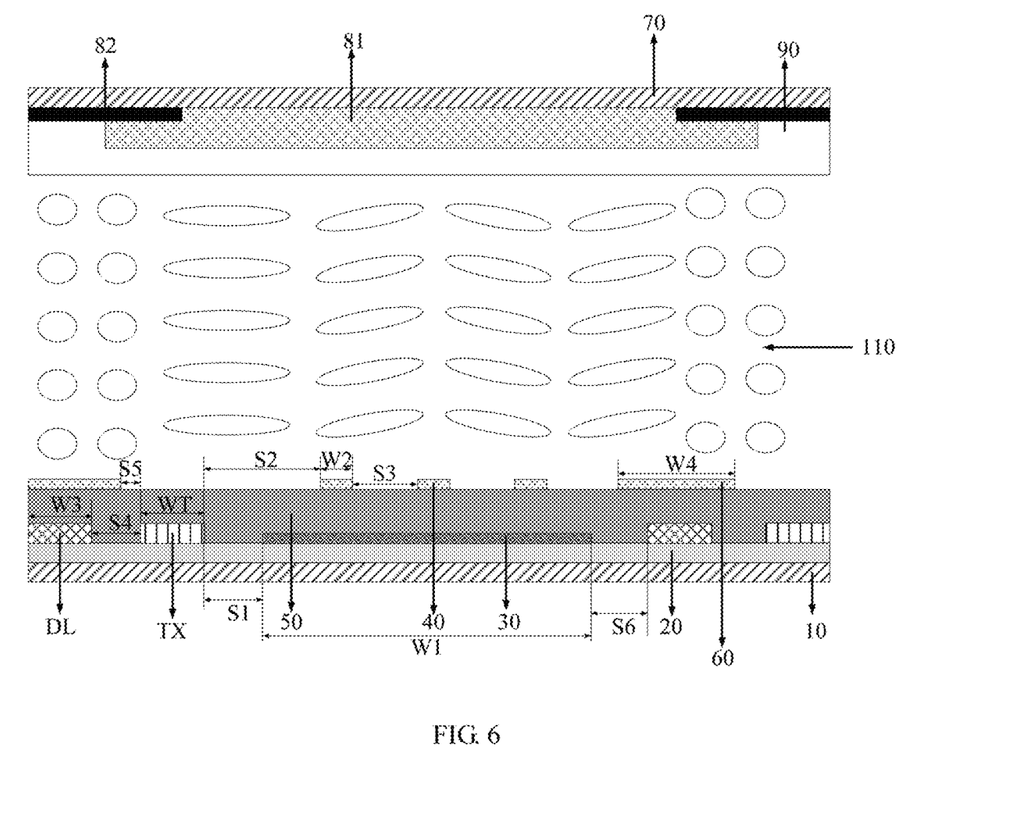
FIG. 6 is a schematic diagram of a display apparatus to which the display substrate shown in FIG. 5 is applied.
Figure 7:
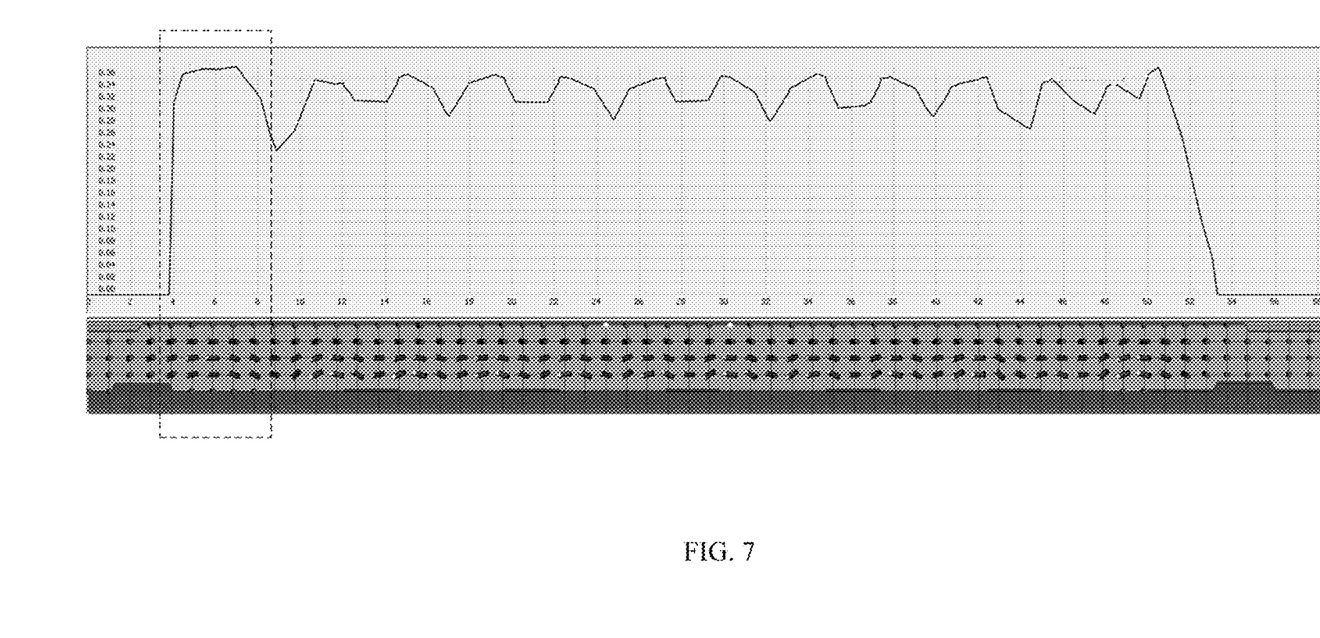
FIG. 7 is a schematic diagram of simulated liquid crystal light effect of the display apparatus in FIG. 6.

In order to verify the performance of the display substrate according to the embodiment of the present disclosure, experimental verification is performed by applying the display substrate to a display apparatus. FIG. 6 is a schematic diagram of a display apparatus to which the display substrate shown in FIG. 5 is applied. Specifically, as shown in FIG. 6, the display apparatus includes not only the display substrate shown in FIG. 5, but also a color filter substrate arranged opposite to the display substrate, and a liquid crystal layer 110 arranged between the display substrate and the color filter substrate. The color filter substrate includes a base substrate 70, a color filter layer arranged on the base substrate 70, and a planarization layer 90 arranged on a side of the color filter layer away from the base substrate 70. The color filter layer includes a color filter 81 and a black matrix 82, and an orthographic projection of the black matrix 82 on the base substrate 10 covers the orthographic projection of the data line DL, the touch signal line TX, the non-light-transmitting element such as the thin film transistor 20 in the sub-pixels 01 and the like on the base substrate 10. A line width W3 of the data line DL is 3 μm, a line width WT of the touch signal line TX is 3 μm, a spacing S4 between the data line DL and the touch signal line TX closest to the data line DL is 4.5 μm, a width W1 of the pixel electrode 30 is 39.75 μm, a spacing S6 between the pixel electrode 30 and the data line DL closest to the pixel electrode 30 is 5 μm, a spacing (i.e., the first distance) S1 between the touch signal line TX and the pixel electrode 30 closest to the touch signal line TX is 4.5 μm, a spacing (i.e., the second distance) S2 between the touch signal line TX and the common electrode 40 closest to the touch signal line TX is 5.25 μm, a width W4 of the shield electrode 60 is 9 μm, and the orthographic projections of the shield electrode 60 and the data line DL, which has the orthographic projection on the base substrate 10 overlapping the orthographic projection of the shield electrode 60 on the base substrate 10, on the base substrate 10 have a common center line, a maximum spacing (S5+WT+S2) between the shield electrode 60 and the common electrode 40 adjacent to the shield electrode 60 is 12.75 μm, and a width W2 of the common electrode 40 is 2.6 μm, a slit width S3 of the common electrode 40 is 5 μm. In this case, the pixel electrode 30 and the touch signal line TX form a coplanar electric field, and the pixel electrode 30 and the common electrode 40 form a fringe electric field, the two electric fields drive the liquid crystal molecules to rotate together, so as to provide the liquid crystal light effect of the liquid crystal layer 110. FIG. 7 is a schematic diagram of simulated liquid crystal light effect of the display apparatus in FIG. 6. As shown in FIG. 7, a planar electric field is formed between the touch signal line TX and the pixel electrode 30 to deflect liquid crystal molecules, thereby effectively improving the light transmittance of the display apparatus.

In a second example, the display substrate is the display substrate shown in FIG. 4, and the display substrate includes a plurality of gate lines GL, a plurality of data lines DL, a plurality of touch signal lines TX, and a plurality of sub-pixels 01. The gate lines GL extend along the first direction X and are arranged side by side along the second direction Y, and the data lines DL and the touch signal lines TX extend along the second direction Y and are arranged side by side along the first direction X. The gates of the thin film transistors 20 in the sub-pixels 01 in the same first pixel group 101 and in the odd-numbered second pixel groups 102 are connected to the same gate line GL, and the gates of the thin film transistors 20 in the sub-pixels 01 in the same first pixel group 101 and in the even-numbered second pixel groups 102 are connected to the same gate line GL. The sources of the thin film transistors 20 in the sub-pixels 01 in every two adjacent second pixel groups 102 are connected to the same data line DL. Two gate lines GL for supplying scan signals to the sub-pixels 01 in the same first pixel group 101 are located at two sides of the first pixel group 101 in the second direction Y, respectively. The data line DL is located between two second pixel groups 102, to which the data voltage signals are supplied by this data line DL. With this arrangement, wiring is facilitated, and connection between the sub-pixels 01 and the signal lines is also facilitated.

Figure 8:
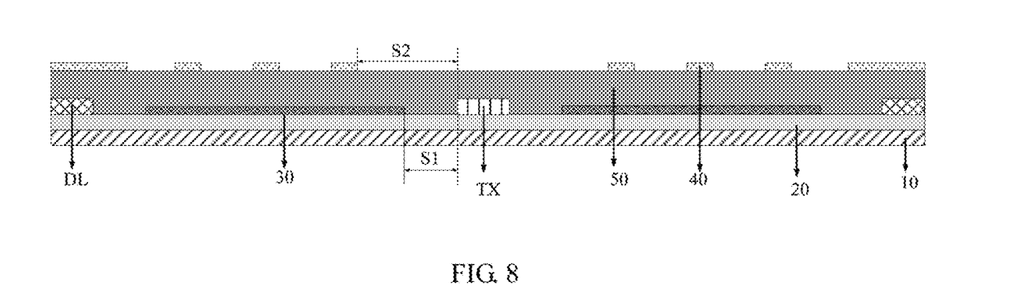
FIG. 8 is a cross-sectional view of the display substrate shown in FIG. 4 taken along a line B-B'.

FIG. 8 is a cross-sectional view of the display substrate shown in FIG. 4 taken along a line B-B'. As shown in FIG. 8, the pixel electrode 30 and the common electrode 40 in each sub-pixel 01 are a plate electrode and a slit electrode, respectively, in which case the pixel electrode 30 is closer to the base substrate 10 than the common electrode 40. A first interlayer insulating layer 50 is arranged between the pixel electrode 30 and the common electrode 40, and the touch signal line TX and the data line DL are arranged in the same layer as the pixel electrode 30. A distance between orthographic projections of any touch signal line TX in the display substrate and the pixel electrode 30 closest to the touch signal line TX on the base substrate 10 is a first distance S1, a distance between orthographic projections of the touch signal line TX and the common electrode 40 closest to the touch signal line TX on the base substrate 10 is a second distance S2, and the first distance S1 is less than the second distance S2, so that in the display stage, not only the pixel electrode 30 and the common electrode 40 form a fringe electric field, but also the pixel electrode 30 and the touch signal line TX form a coplanar electric field, and when the display substrate is applied to a display apparatus, the light transmittance can be effectively improved.

In some examples, a plurality of shielding electrodes 60 are further arranged on a side of the first interlayer insulating layer 50 away from the base substrate 10, and an orthographic projection of each shielding electrode 60 on the base substrate 10 covers an orthographic projection of one corresponding data line DL on the base substrate 10. The reason for such an arrangement is to prevent the liquid crystal molecules of the display apparatus including the display substrate from ineffectively deflecting at the position to affect the display of the display apparatus due to an electric field generated between the touch signal line and the data line DL in the display stage. The shielding electrode 60 in the embodiment of the present disclosure may be arranged in the same layer and made of the same material as the common electrode 40, so that the common electrode 40 and the shielding electrode 60 may be formed through one patterning process, which does not increase the process steps and is also beneficial to thinning the product. Further, in the embodiment of the present disclosure, on the basis of overlapping each other, the orthographic projections of the shielding electrode 60 and the data line DL on the base substrate 10 have a common center line, so that the shielding electrode 60 can be ensured to well cover the electric field area formed between the data line DL and the common electrode 40.

In some examples, as shown in FIGS. 4 and 8, for convenience of wiring and for uniformity of transmittance of the display substrate, the data line DL and the touch signal line TX are located on different sides of the same second pixel group 102 in the first direction X.

Figure 9:
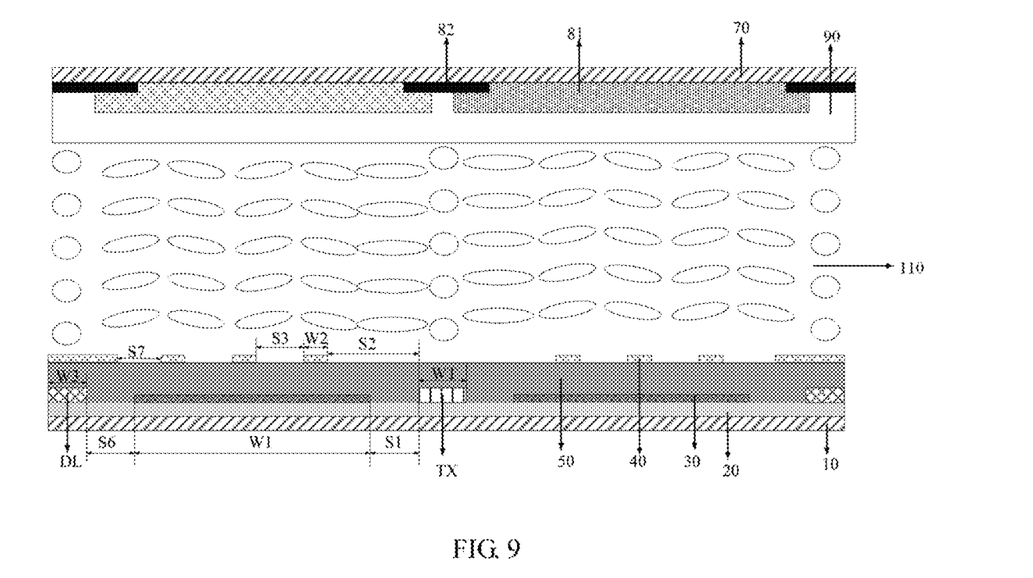
FIG. 9 is a schematic diagram of a display apparatus to which the display substrate shown in FIG. 8 is applied.
Figure 10:
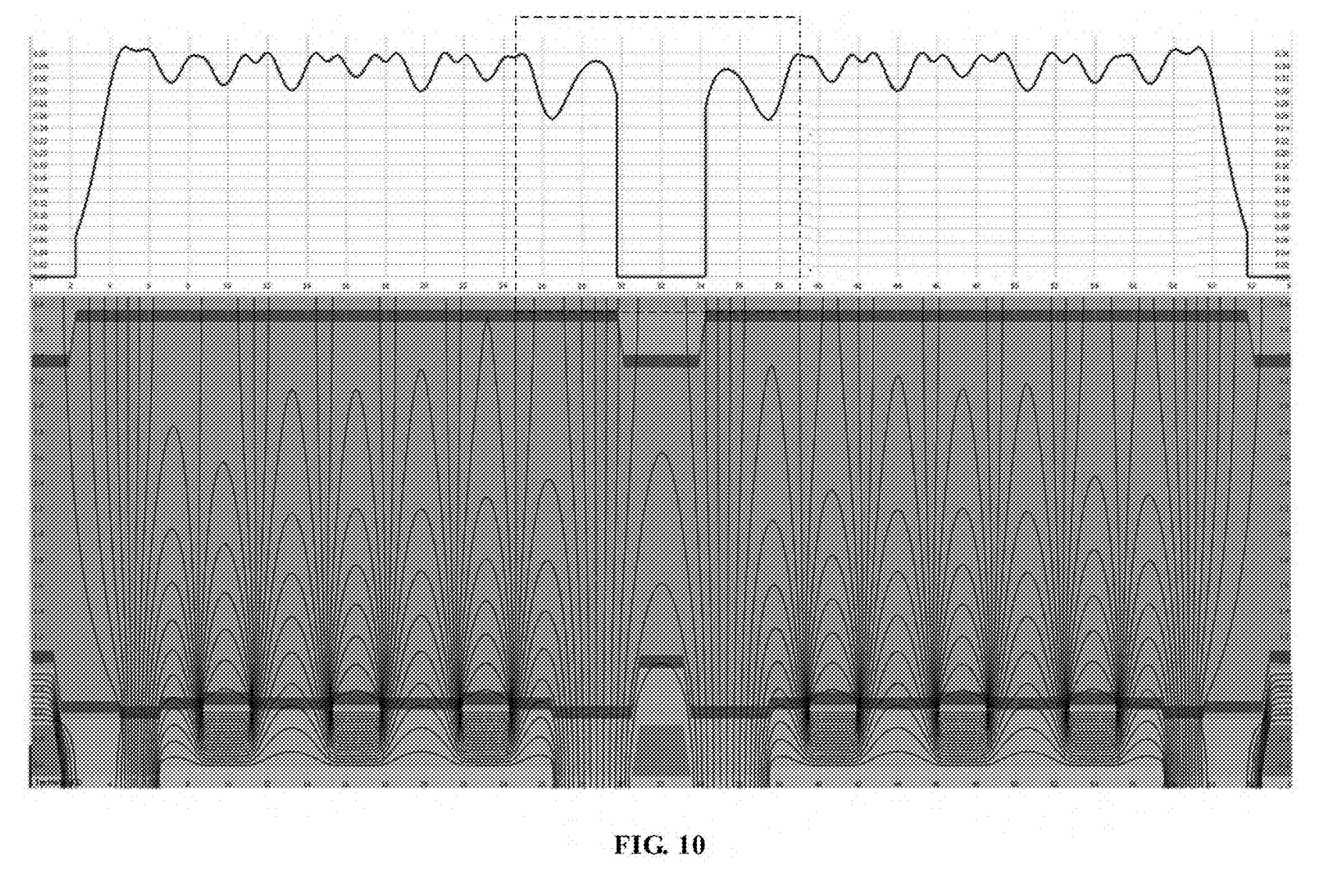
FIG. 10 is a schematic diagram of the simulated liquid crystal light effect of the display apparatus in FIG. 9.

In order to verify the performance of the display substrate according to the embodiment of the present disclosure, experimental verification is performed by applying the display substrate to a display apparatus. FIG. 9 is a schematic diagram of a display apparatus to which the display substrate shown in FIG. 8 is applied. Specifically, as shown in FIG. 9, the display apparatus includes not only the display substrate in FIG. 8, but also a color filter substrate arranged opposite to the display substrate, and a liquid crystal layer 110 arranged between the display substrate and the color filter substrate. The color filter substrate includes a base substrate 70, a color filter layer arranged on the base substrate 70, and a planarization layer 90 arranged on a side of the color filter layer away from the base substrate 70. The color filter layer includes a color filter 81 and a black matrix 82, and an orthographic projection of the black matrix 82 on the base substrate 10 covers the orthographic projection of the data line DL, the touch signal line TX, the non-light-transmitting element such as the thin film transistor 20 in the sub-pixels 01 and the like on the base substrate 10. A line width W3 of the data line DL is 3 μm, a dimension WT of the touch signal line TX is 3 μm, a spacing S4 between the data line DL and the touch signal line TX closest to the data line DL is 4.5 μm, a width W1 of the pixel electrode 30 is 20 μm, a spacing S6 between the pixel electrode 30 and and the data line DL closest to the pixel electrode 30 is 5 μm, a spacing S1 (i.e., the first distance S1) between the pixel electrode 30 and the touch signal line TX closest to the pixel electrode 30 is 4.5 μm, a spacing S2 (i.e., the second distance S2) between the touch signal line TX and the common electrode 40 closest to the touch signal line TX is 6.2 μm, a width of the shielding electrode 60 is 9 μm, and the orthographic projections of the shield electrode 60 and the data line DL, which has the orthographic projection on the base substrate 10 overlapping the orthographic projection of the shield electrode 60 on the base substrate 10, on the base substrate 10 have a common center line, a minimum spacing S7 between the shielding electrode 60 and the common electrode 40 adjacent to the shielding electrode is 4.2 μm, a width of the common electrode 40 is 2.4 μm, and a slit width of the common electrode 40 is 4.2 μm. In this case, the pixel electrode 30 and the touch signal line TX form a coplanar electric field, and the pixel electrode 30 and the common electrode 40 form a fringe electric field, the two electric fields drive the liquid crystal molecules to rotate together, so as to provide the liquid crystal light effect of the liquid crystal layer 110. FIG. 10 is a schematic diagram of the simulated liquid crystal light effect of the display apparatus in FIG. 9. As shown in FIG. 10, a planar electric field is formed between the touch signal line TX and the pixel electrode 30 to deflect liquid crystal molecules, thereby effectively improving the light transmittance of the display apparatus.

In a third example, the display substrate includes a plurality of gate lines GL, a plurality of data lines DL, a plurality of touch signal lines TX, and a plurality of sub-pixels 01. The gate lines GL extend along the first direction X and are arranged side by side along the second direction Y, and the data lines DL and the touch signal lines TX extend along the second direction Y and are arranged side by side along the first direction X. The gate line GL and the data line DL are arranged to cross each other, and a sub-pixel 01 is arranged at the cross position of the gate line GL and the data line DL. The gates of the thin film transistors 20 in the sub-pixels 01 in the same first pixel group 101 are connected to the same gate line GL, and the sources of the thin film transistors 20 in the sub-pixels 01 of the same second pixel group 102 are connected to the same data line DL. A first pixel group 101 is arranged between any two adjacent gate lines GL; a second pixel group 102 is arranged between any two adjacent data lines DL; and a second pixel group 102 is arranged between any two adjacent touch signal lines TX.

Figure 11:
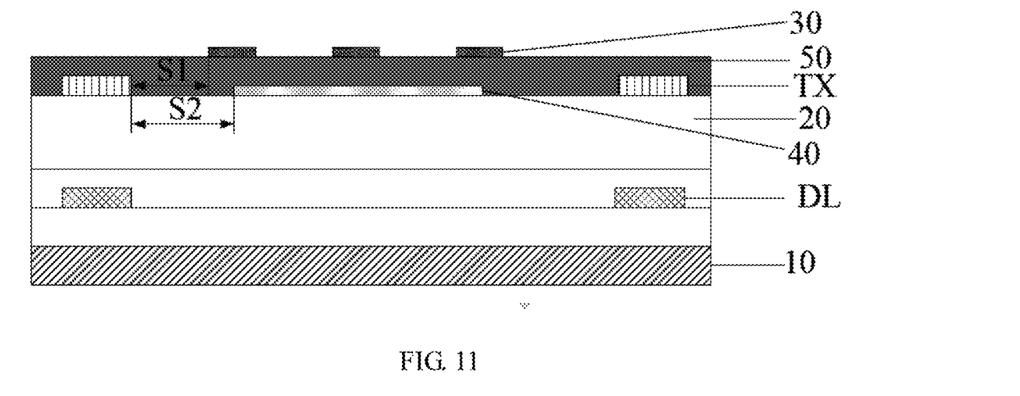
FIG. 11 is a cross-sectional view of a part of a display substrate according to an embodiment of the present disclosure.

FIG. 11 is a cross-sectional view of a part of a display substrate according to an embodiment of the present disclosure. Referring to FIG. 11, the common electrode 40 and the pixel electrode 30 in each sub-pixel 01 are a plate electrode and a slit electrode, respectively, in which case the common electrode 40 is closer to the base substrate 10 than the pixel electrode 30. A first interlayer insulating layer 50 is arranged between the pixel electrode 30 and the common electrode 40, and the touch signal line TX and the common electrode 40 are arranged in the same layer. The data lines DL are arranged on a side of the touch signal lines TX close to the base substrate 10, and a second interlayer insulating layer 120 is arranged between a layer where the touch signal lines TX are located and a layer where the data lines DL are located. The distance between orthographic projections of any one of the touch signal lines TX in the display substrate and the pixel electrode 30 closest to the touch signal line TX on the base substrate 10 is the first distance S1, the distance between orthographic projections of the touch signal line TX and the common electrode 40 closest to the touch signal line TX on the base substrate 10 is the second distance S2, and the first distance S1 is less than the second distance S2, so that in the display stage, not only the pixel electrode 30 and the common electrode 40 form an electric field in an FFS (Fringe Field Switching) mode, but also the pixel electrode 30 and the touch signal line TX form an electric field in an IPS (In Plane Switching) mode, and when the display substrate is applied to a display apparatus, the light transmittance can be effectively improved.

In some examples, referring to FIG. 11, an orthographic projection of each data line DL on the base substrate 10 at least partially overlaps an orthographic projection of one corresponding touch signal line TX on the base substrate 10. Through this arrangement, an effective pixel aperture ratio can be obtained.

In addition, it should be noted that since one data line DL and one touch signal line TX are arranged between any two adjacent second pixel groups 102, in order to facilitate connection between the data line DL and the source of the thin film transistor 20 in the sub-pixel 01, the touch signal line TX is located on a side of the data line DL closest to the touch signal line TX from the second pixel group 102 to which the data line DL is connected.

Figure 12:
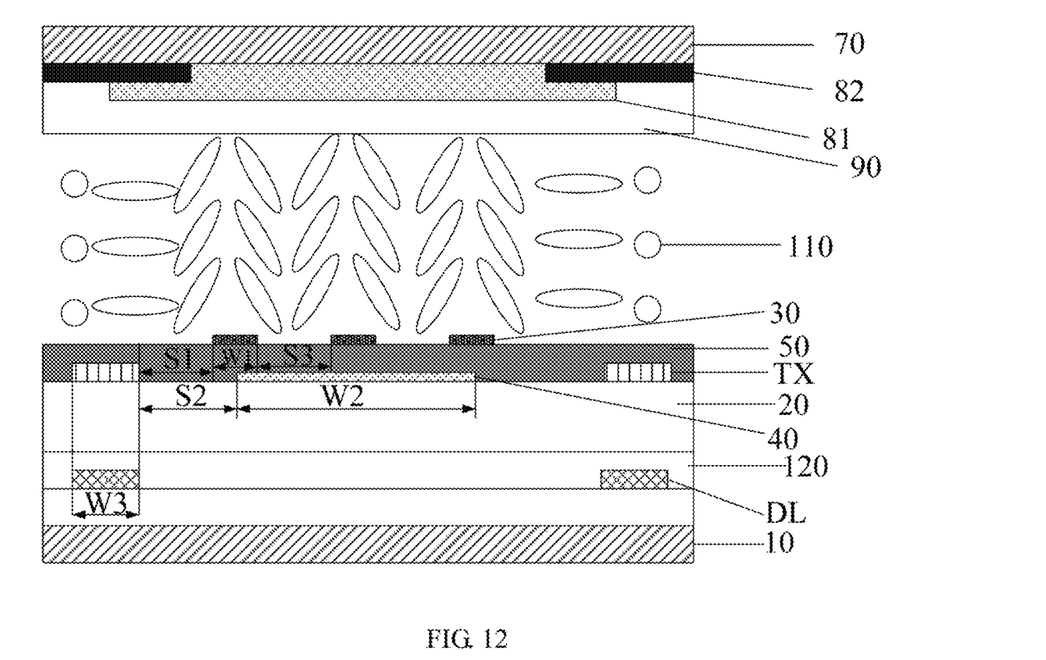
FIG. 12 is a schematic diagram of a display apparatus to which the display substrate shown in FIG. 11 is applied.
Figure 13:
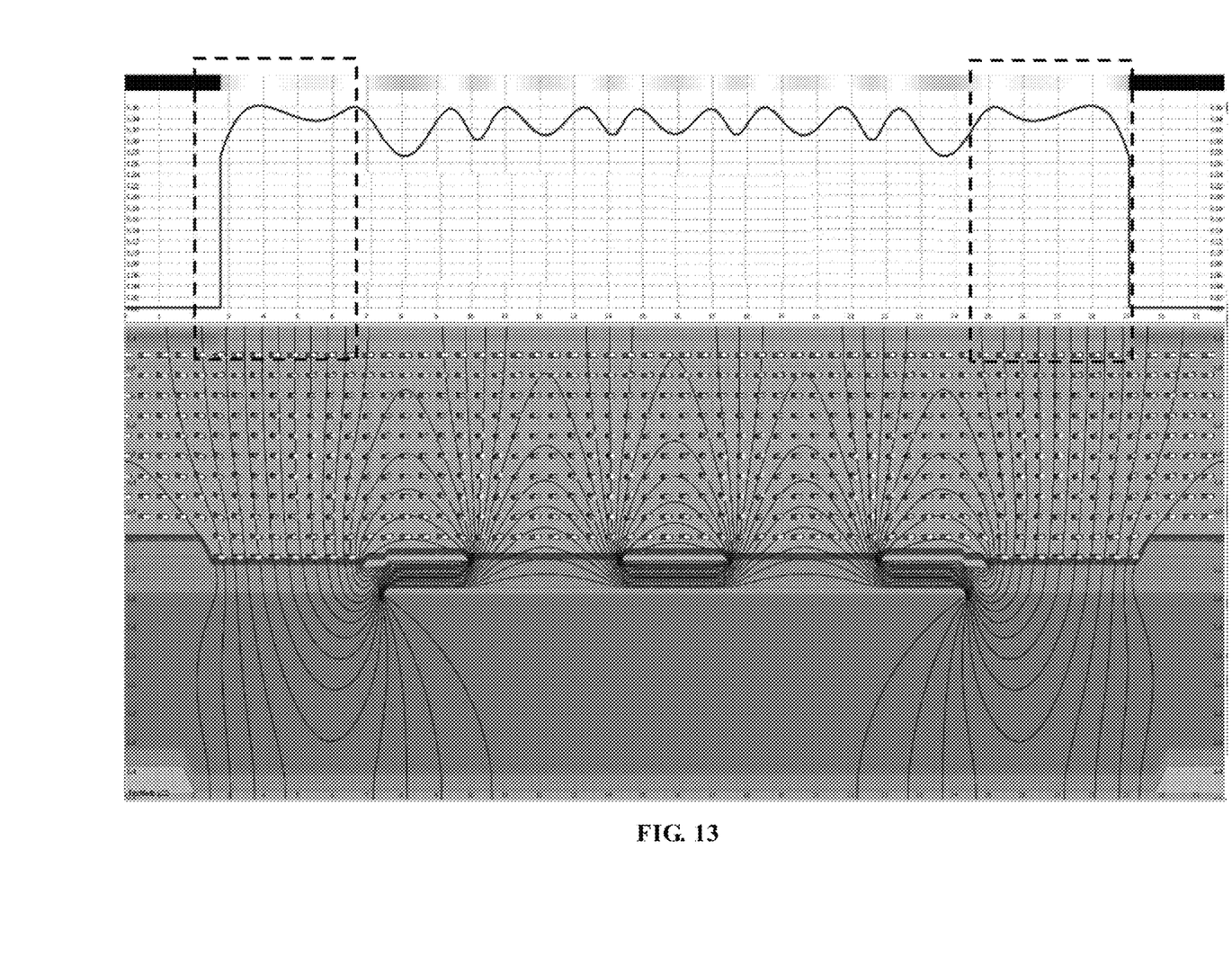
FIG. 13 is a schematic diagram of the simulated liquid crystal light effect of the display apparatus in FIG. 12.

In order to verify the performance of the display substrate according to the embodiment of the present disclosure, experimental verification is performed by applying the display substrate to a display apparatus. FIG. 12 is a schematic diagram of a display apparatus to which the display substrate shown in FIG. 11 is applied. Specifically, as shown in FIG. 12, the display apparatus includes not only the display substrate in FIG. 11, but also a color filter substrate arranged opposite to the display substrate, and a liquid crystal layer 110 arranged between the display substrate and the color filter substrate. The color filter substrate includes a base substrate 70, a color filter layer arranged on the base substrate 70, and a planarization layer 90 arranged on a side of the color filter layer away from the base substrate 70. The color filter layer includes a color filter 81 and a black matrix 82, and the orthographic projection of the black matrix 82 on the base substrate 10 covers the orthographic projections of the data line DL, the touch signal line TX, the non-light-transmitting element such as the thin film transistor 20 in the sub-pixel 01 and the like on the base substrate 10. The line width W1 of the data line DL is 4 μm, the width WT of the touch signal line TX is 4 μm, the width W2 of the common electrode 40 is 17 μm, the spacing S2 (i.e., the second distance S2) between the common electrode 40 and the data line DL/touch signal line TX closest to the common electrode 40 is 5.5 μm, the spacing S1 (i.e., the first distance S1) between the pixel electrode 30 and the touch signal line TX closest to the pixel electrode 30 is 4.9 μm, the width W1 of the pixel electrode 30 is 3.4 μm, and the slit width S3 of the pixel electrode 30 is 4 μm. In this case, the pixel electrode 30 and the common electrode 40 form an electric field in an FFS mode, and the pixel electrode 30 and the touch signal line TX form an electric field in an IPS mode, the two electric fields together drive the liquid crystal molecules to rotate, providing a liquid crystal light effect of the liquid crystal layer 110. FIG. 13 is a schematic diagram of the simulated liquid crystal light effect of the display apparatus in FIG. 12. As shown in FIG. 13, a planar electric field is formed between the touch signal line TX and the pixel electrode 30 to deflect liquid crystal molecules, thereby effectively improving the light transmittance of the display apparatus.

It should be noted that the above description only provides three specific examples, which do not limit the protection scope of the embodiments of the present disclosure.

In a second aspect, the present embodiment provides a display apparatus, which includes the display substrate described above. The display apparatus may be any product or component having a display function, such as a liquid crystal panel, a mobile phone, a tablet computer, a television, a monitor, a notebook computer, a digital photo frame, a navigator, or the like.

The display apparatus according to the present embodiment includes the display apparatus described above, so the optical transmittance of the display apparatus is obviously improved.

Alternatively, the display apparatus according to the present embodiment may further include other conventional structures, such as a power supply unit, a display driving unit, and the like.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the protection scope of the present disclosure.

What is claimed is:

1. A display substrate, comprising:
   a base substrate,
   a plurality of sub-pixels on the base substrate, wherein each of the plurality of sub-pixels comprises at least a pixel electrode and a common electrode on the base substrate; respective ones of the sub-pixels arranged side by side in a first direction form a first pixel group; and
   respective ones of the sub-pixels arranged side by side in a second direction form a second pixel group;
   a first interlayer insulating layer between a layer where the pixel electrode is located and a layer where the common electrode is located; and
   a plurality of touch signal lines on the base substrate, wherein the plurality of touch signal lines extend along the second direction and are arranged side by side along the first direction,
   wherein each of the plurality of touch signal lines is arranged between corresponding two adjacent second pixel groups in at least a part of the second pixel groups; and
   for any one of the plurality of touch signal lines, a distance between orthographic projections of the touch signal line and the pixel electrode in the sub-pixel closest to the touch signal line in the first direction on the base substrate is a first distance; a distance between orthographic projections of the touch signal line and the common electrode in the sub-pixel closest to the touch signal line in the first direction on the base substrate is a second distance, and the first distance is less than the second distance,
   wherein the common electrode is closer to the base substrate than the pixel electrode; and the touch signal line and the common electrode are in a same layer.

2. A display apparatus, comprising the display substrate according to claim 1.

3. A display substrate, comprising:
   a base substrate,
   a plurality of sub-pixels on the base substrate, wherein each of the plurality of sub-pixels comprises at least a pixel electrode and a common electrode on the base substrate; respective ones of the sub-pixels arranged side by side in a first direction form a first pixel group; and
   respective ones of the sub-pixels arranged side by side in a second direction form a second pixel group;
   a first interlayer insulating layer between a layer where the pixel electrode is located and a layer where the common electrode is located; and
   a plurality of touch signal lines on the base substrate, wherein the plurality of touch signal lines extend along the second direction and are arranged side by side along the first direction,
   wherein each of the plurality of touch signal lines is arranged between corresponding two adjacent second pixel groups in at least a part of the second pixel groups; and
   for any one of the plurality of touch signal lines, a distance between orthographic projections of the touch signal line and the pixel electrode in the sub-pixel closest to the touch signal line in the first direction on the base substrate is a first distance; a distance between orthographic projections of the touch signal line and the common electrode in the sub-pixel closest to the touch signal line in the first direction on the base substrate is a second distance, and the first distance is less than the second distance,
   wherein the display substrate further comprises:
   a plurality of data lines on the base substrate; and
   a plurality of shielding electrodes on a side of the first interlayer insulating layer away from the base substrate, wherein an orthographic projection of each of the plurality of shielding electrodes on the base substrate covers an orthographic projection of one corresponding data line on the base substrate, wherein the shielding electrode and the common electrode are in a same layer and are made of a same material.

4. The display substrate according to claim 3, wherein the pixel electrode is closer to the base substrate than the common electrode; and the touch signal line and the pixel electrode are in a same layer.

5. The display substrate according to claim 3, wherein the plurality of data lines extend along the second direction and are arranged side by side along the first direction; and data voltage signals are supplied to the sub-pixels in a same second pixel group through a same data line.

6. The display substrate according to claim 5, wherein the data line and the touch signal line are in a same layer.

7. The display substrate according to claim 5, wherein the plurality of data lines are on a side of the plurality of touch signal lines close to the base substrate, and a second interlayer insulating layer is between a layer where the plurality of touch signal lines are located and a layer where the plurality of data lines are located.

8. The display substrate according to claim 7, wherein an orthographic projection of each of the plurality of data lines on the base substrate at least partially overlaps an orthographic projection of a corresponding one of the plurality of touch signal lines on the base substrate.

9. The display substrate according to claim 5, further comprising a plurality of gate lines on the base substrate; wherein the plurality of gate lines extend along the first direction and are arranged side by side along the second direction; and
a scan signal is supplied to the sub-pixels in a same first pixel group through a same gate line; and data voltages are supplied to the sub-pixels in one of the second pixel groups through a corresponding one of the plurality of data lines.

10. The display substrate according to claim 5, further comprising a plurality of gate lines on the base substrate; wherein the plurality of gate lines extend along the first direction and are arranged side by side along the second direction; and
two scan signals are supplied to the sub-pixels in a same first pixel group through two gate lines, respectively, wherein the sub-pixels in odd-numbered second pixel groups and in the first pixel group are controlled by one of the two gate lines, and the sub-pixels in even-numbered second pixel groups and in the first pixel group are controlled by the other of the two gate lines; and
for every two adjacent second pixel groups, data voltage signals are supplied to the sub-pixels in the two adjacent second pixel groups through a corresponding one of the plurality of data lines.

11. The display substrate according to claim 10, wherein each of the plurality of data lines and a corresponding one of the plurality of touch signal lines are on different sides of a same second pixel group in the first direction.

12. The display substrate according to claim 3, wherein orthographic projections, on the base substrate, of center lines of the shielding electrode and the data line, which have orthographic projections on the base substrate overlapping each other, coincide with each other.

13. The display substrate according to claim 3, wherein a ratio of the first distance to the second distance is greater than or equal to 0.5, and less than 1.

14. The display substrate according to claim 3, wherein the first distance is in a range of 1 μm to 10 μm; the second distance is in a range of 1 μm to 15 μm.

15. The display substrate according to claim 3, wherein one of the pixel electrode and the common electrode is a plate electrode, the other of the pixel electrode and the common electrode is a slit electrode, and the plate electrode is closer to the base substrate than the slit electrode; and
a width of the slit electrode is in a range of 1 μm to 5 μm, and a gap between any two adjacent slit electrodes is in a range of 1 μm to 10 μm; and a width of the plate electrode is not less than 3 μm.

16. The display substrate according to claim 3, wherein a line width of the touch signal line is in a range of 1 μm to 10 μm.

17. A display apparatus, comprising the display substrate according to claim 1.

18. The display apparatus according to claim 17, wherein the pixel electrode is closer to the base substrate than the common electrode; and the touch signal line and the pixel electrode are in a same layer.

* * * * *